United States Patent
Sahm

(10) Patent No.: US 7,146,891 B2
(45) Date of Patent: Dec. 12, 2006

(54) DEVICE FOR TRANSFERRING TWO-DIMENSIONAL PRODUCTS ONTO A TRANSPORTATION DEVICE

(75) Inventor: Dieter Sahm, Ingelbach (DE)

(73) Assignee: LTS Lohmann Therapie-Systeme AG, Andernach (DE)

( * ) Notice: Subject to any disclaimer, the term of this patent is extended or adjusted under 35 U.S.C. 154(b) by 0 days.

(21) Appl. No.: 10/683,089

(22) Filed: Oct. 10, 2003

(65) Prior Publication Data

US 2004/0074354 A1  Apr. 22, 2004

Related U.S. Application Data

(63) Continuation of application No. 09/555,990, filed as application No. PCT/EP98/07505 on Nov. 21, 1998, now Pat. No. 6,658,973.

(30) Foreign Application Priority Data

Dec. 11, 1997 (DE) ................. 197 55 058

(51) Int. Cl.
  *B26D 1/00* (2006.01)
  *B26D 7/06* (2006.01)

(52) U.S. Cl. .............. 83/22; 83/24; 83/99; 83/100; 83/155; 271/197; 271/276; 226/95; 226/170

(58) Field of Classification Search ............ 83/22–24, 83/27, 37, 55, 152, 154, 155, 100, 99, 346, 83/669, 102, 105, 325, 345, 673, 670, 339, 83/911, 98, 145, 146, 158, 165; 156/164; 271/197, 276, 6, 275, 307, 69, 225, 310, 271/185, 309, 70, 188; 226/95, 170; 198/408, 198/689.1, 377.04, 377.08, 456
See application file for complete search history.

(56) References Cited

U.S. PATENT DOCUMENTS

| | | | | |
|---|---|---|---|---|
| 3,103,842 A | * | 9/1963 | Winkler et al. | 83/99 |
| 3,174,372 A | * | 3/1965 | Huck | 83/110 |
| 3,269,235 A | * | 8/1966 | Crouch et al. | 83/99 |
| 3,628,408 A | * | 12/1971 | Rod | 83/175 |
| 3,889,801 A | | 6/1975 | Boyer | |
| 3,911,805 A | * | 10/1975 | Baird | 99/353 |
| 4,080,856 A | * | 3/1978 | Shearon | 83/99 |

(Continued)

FOREIGN PATENT DOCUMENTS

DE  3230662  4/1983

(Continued)

*Primary Examiner*—Allan N. Shoap
*Assistant Examiner*—Ghassem Alie
(74) *Attorney, Agent, or Firm*—Jordan and Hamburg, LLP

(57) ABSTRACT

A method for segregating and transferring a product from a web of material includes the steps of conveying the web of material between a punching roll and a counter pressure roll, the punching roll having at least one cutting edge and at least one suction orifice; punching-out the product from the web with the cutting edge; adhering the punched-out product on the punching roll under a vacuum connected to the at least one suction orifice; rotating the punching roll to position the punched-out product proximate to a conveyor belt; detaching the punched-out product from the punching roll; and transferring the punched-out product onto the conveyor belt. In certain embodiments, the suction orifice of the punching roll is ventilated with a gas stream to facilitate detachment of the punched-out product; and a vacuum is applied to the conveyor belt to draw the detached product thereto and hold it thereon under suction.

18 Claims, 5 Drawing Sheets

U.S. PATENT DOCUMENTS

| | | |
|---|---|---|
| 4,483,351 A | 11/1984 | Seragnoli |
| 4,495,746 A * | 1/1985 | Focke et al. ............... 53/389.3 |
| 4,537,588 A * | 8/1985 | Ehlscheid et al. .......... 493/342 |
| 4,671,152 A * | 6/1987 | Blumle ...................... 83/152 |
| 5,109,741 A * | 5/1992 | Fuchs ........................ 83/100 |
| 5,224,405 A * | 7/1993 | Pohjola ....................... 83/24 |
| 5,569,016 A | 10/1996 | Mokler |
| 5,979,279 A * | 11/1999 | Matsumoto et al. ........... 83/24 |
| 6,658,973 B1 * | 12/2003 | Sahm .......................... 83/155 |

FOREIGN PATENT DOCUMENTS

| | | |
|---|---|---|
| DE | 4433912 | 3/1996 |
| JP | 8-72839 | 3/1996 |
| JP | 9-124019 | 5/1997 |

* cited by examiner

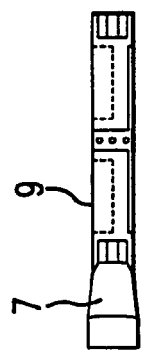
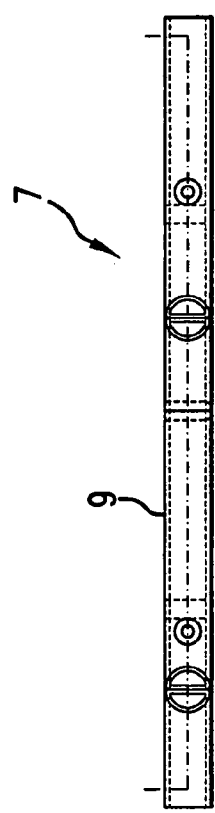
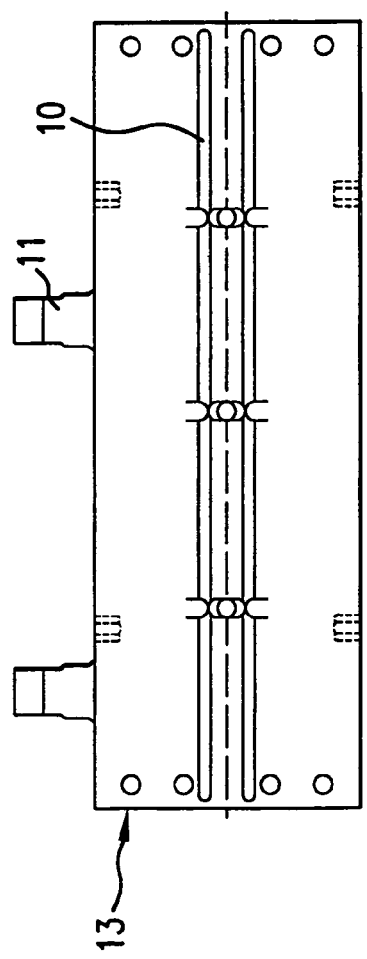
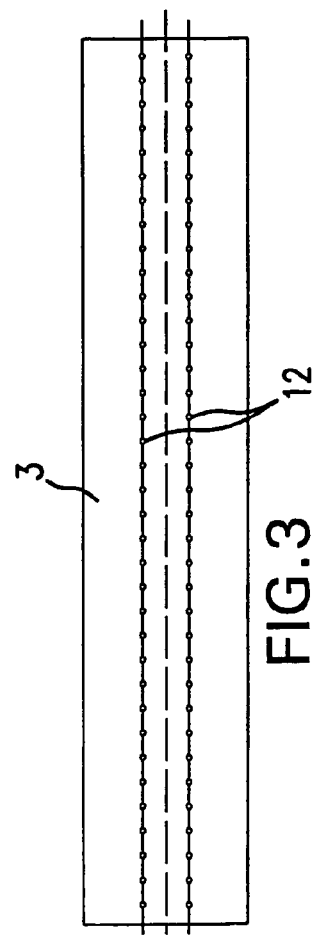
FIG. 2c
FIG. 2a
FIG. 2b
FIG. 3

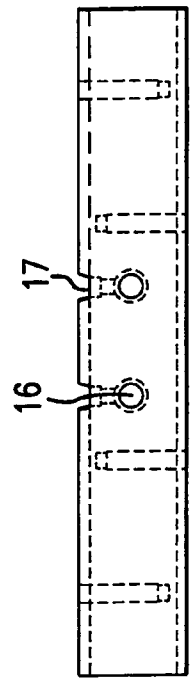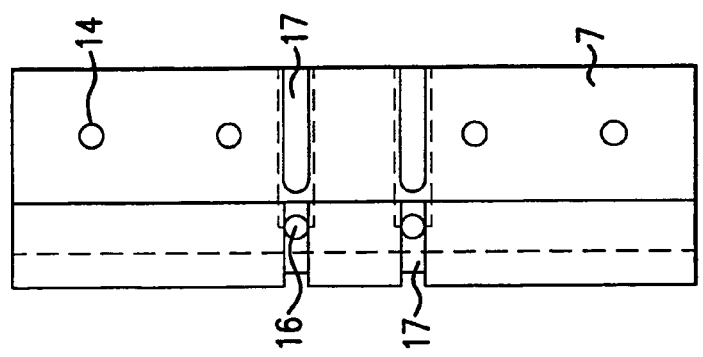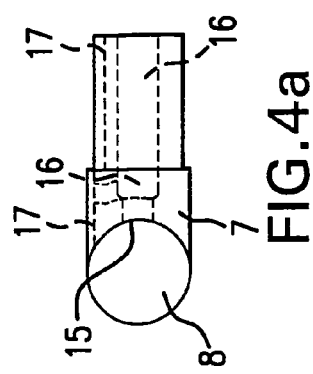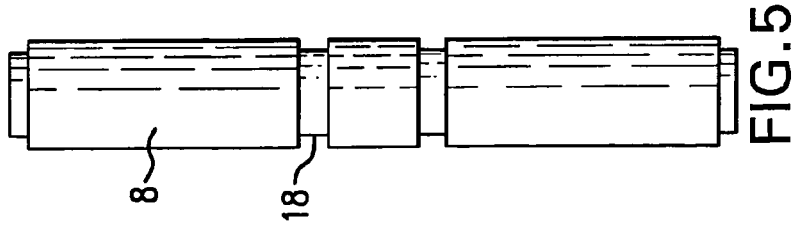

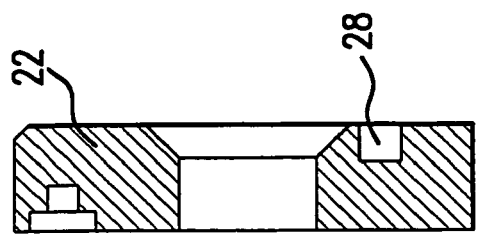
FIG.7b
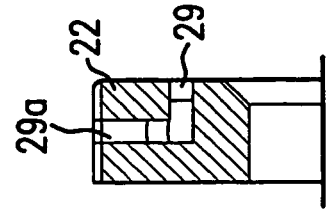
FIG.d
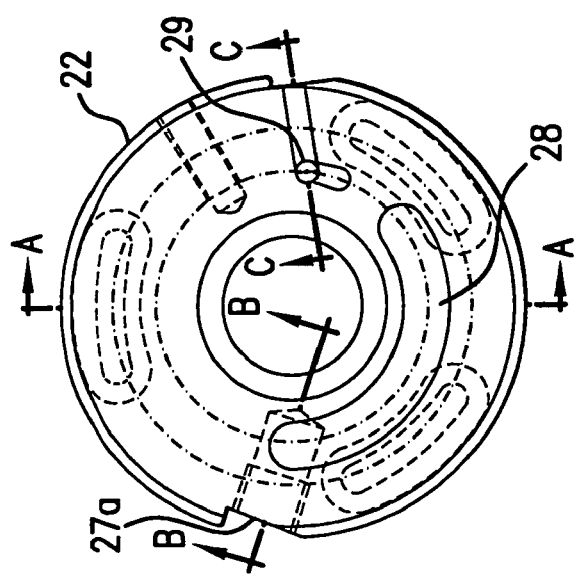
FIG.7a
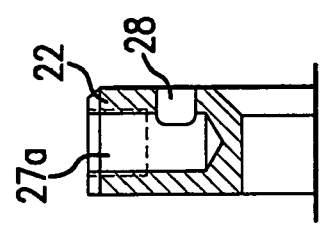
FIG.7c

DEVICE FOR TRANSFERRING TWO-DIMENSIONAL PRODUCTS ONTO A TRANSPORTATION DEVICE

REFERENCE TO RELATED APPLICATION

This is a continuation and incorporates the disclosure of application Ser. No. 09/555,990, filed Jun. 7, 2000 now U.S. Pat. No. 6,658,973.

BACKGROUND OF THE INVENTION

This invention relates to a device for the transfer, in particular the continuous transfer, of segregated flat-shaped products to a transport device, preferably of plasters, pressure-sensitive adhesive labels or postage stamps.

It is known to employ transfer devices for flat-shaped products which comprise deflecting edges, transfer rolls and also stripping plates for detaching segregated flat-shaped products in a transfer device. However, receiving such products, which have yet been transferred is a particular order, in a likewise ordered fashion by means of a device transporting the products further is problematic, since the order cannot be ensured, especially not in the case of continuous transfer. The products are transported further in rearranged order, which makes the removal thereof for the purpose of packaging or further processing more difficult.

It is the object of the present invention to create a device for the transfer of segregated flat-shaped products, which device permits the ordered transfer of the products from a transfer device and the continued transport of the products in the ordered arrangement.

SUMMARY OF THE INVENTION

This object is achieved in a device according to the invention, in which the transfer device comprises a receiving device which is integrated in a transport device supplying the further transport of the segregated flat-shaped products. The transport device is coupled to a vacuum device such that the products are, in cooperation with the transport device, received in an ordered fashion and fixed thereto. This ensures the continued transport of the products in the ordered arrangement.

The transport device may be a conveyor belt having evenly arranged suction orifices connected to the vacuum device.

The vacuum device is advantageously configured such that it comprises a deflecting strip for the conveyor belt which faces the transfer device and to which a vacuum may be applied, and which is provided with a slide surface for the conveyor belt, to which slide surface a vacuum can be applied also, with grooves and/or slots being arranged in said deflecting strip and in said slide surface which correspond to the suction orifices, and through which air can be sucked off continuously.

In a simple manner, the vacuum device can be provided with a vacuum container which is configured along the transport path and on which the slide surface for the conveyor belt and also the deflecting strip are configured. Via connection pieces, the vacuum container may be equipped with one or more ducts leading to a vacuum pump.

To keep friction between the conveyor belt and the vacuum container low, it is advantageous for the deflecting strip to be provided with a deflecting roll which has circumferential grooves arranged therein as suction orifices, said grooves being connected with the inner space of the vacuum container.

The conveyor belt is provided at the end of the vacuum container which faces away from the deflecting strip with a discharge device for discharging the products, at which device the vacuum acting on the conveyor belt is blocked so that the products can be removed in an ordered manner by suitable means.

The transfer device may be a roll to which a vacuum is applied and which is provided on its surface with suction orifices for the products. The deflecting strip and the conveyor belt which is led around it and the said roll are arranged parallel to each other and spaced such that the products are only just able to pass through the slot formed therebetween without being obstructed, i.e., without touching the conveyor belt. Following this slot (seen in the direction of transport) there is configured a transfer area wherein the connection between the suction orifices to the vacuum-generating device for the roll is blocked. The suction connection between the products and the roll is thereby eliminated, so that the products can be aspirated by the rotating conveyor belt and fixed in the arrangement predetermined by the transfer device and subsequently transported further.

To facilitate and accelerate the transfer process, the suction orifices of the rotating roll can be adapted to be connectable in the transfer region with a blowing device, so that in this region the products are rejected by the roll.

The roll may advantageously be configured to function simultaneously as a punching roll by providing, on the circumference thereof, cutting edges for punching, in accordance with the desired shape of the products. It is possible thereby to unite the segregating device and the transfer device in a simple manner.

The invention will be explained in the following in greater detail with reference to an example of an embodiment thereof read in conjunction with the accompanying drawings.

BRIEF DESCRIPTION OF THE DRAWINGS

FIG. 2a is a front view of a vacuum container for a conveyor belt which provides the further transport of the products;

FIG. 2b is a plan view of the vacuum container;

FIG. 2c a side view of the vacuum container;

FIG. 3 is a plan view of the conveyor belt;

FIG. 4a is a front view of the deflecting strip for the conveyor belt, to which deflecting strip there can be applied a vacuum;

FIG. 4b is a plan view of the deflecting edge;

FIG. 4c is a side view of the deflecting edge;

FIG. 5 is a plan view of a deflecting roll;

FIG. 7a is a vacuum chamber member for the punching roll;

FIG. 7b is a vertical section along A—A of the vacuum chamber member;

FIG. 7c is a section along B—B through the vacuum chamber member; and

FIG. 7d is a section along C—C through the vacuum chamber member.

DETAILED DESCRIPTION OF THE PREFERRED EMBODIMENT

Figure 1:
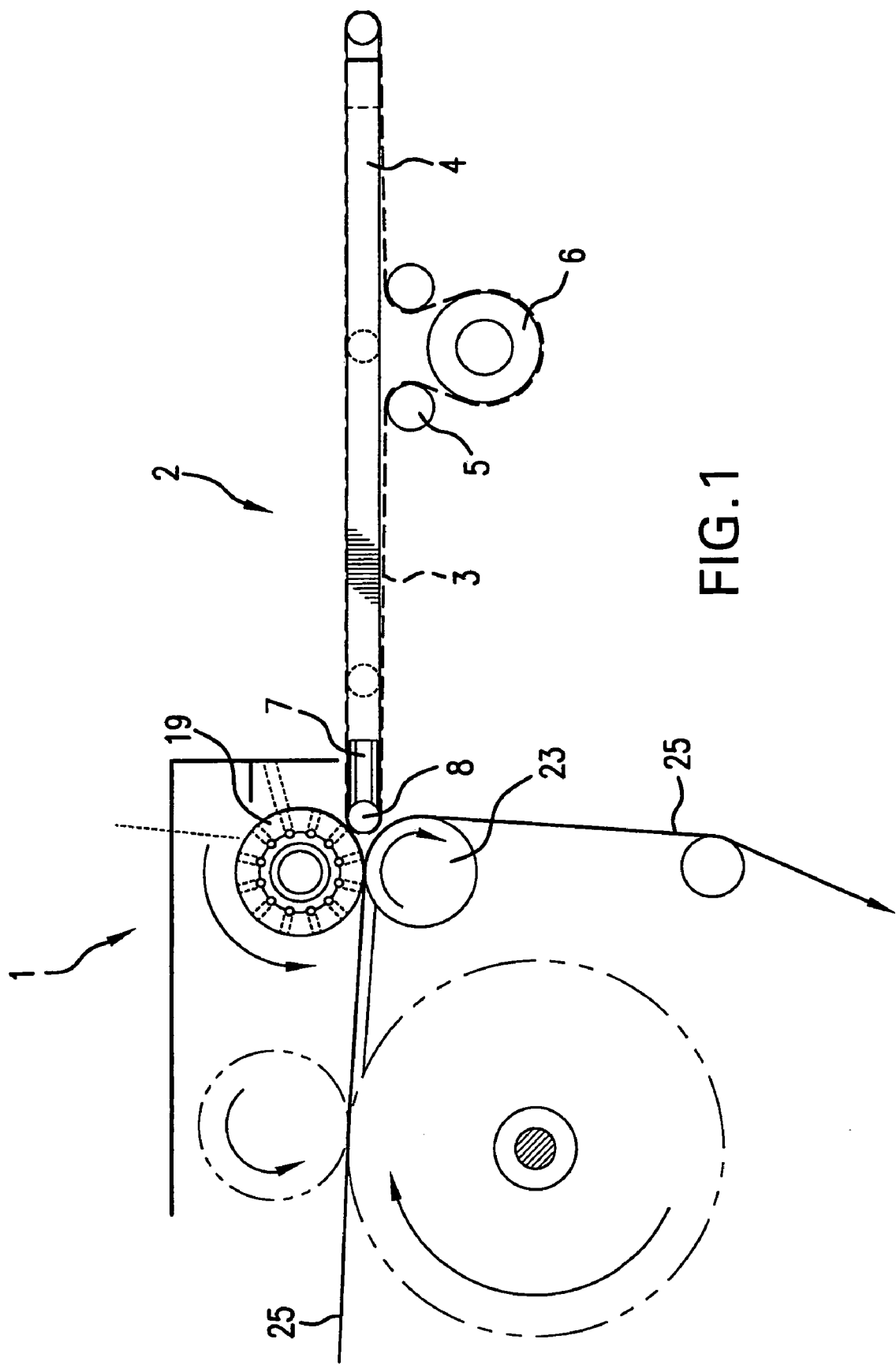
FIG. 1 is a schematic side elevational view of a device according to an embodiment of the present invention for transferring segregated flat-shaped products.

FIG. 1 is a schematic representation of a device made up of a transfer device 1 for the transfer of segregated flat-shaped products in an ordered arrangement and a transport device 2 receiving the products and transporting them further. The transport device 2 has a conveyor belt 3 coupled with a vacuum device (not shown), said conveyor belt 3 being led around a cuboid vacuum container 4 belonging to the vacuum device and two tension rolls 5 disposed therebelow and a driven roll 6. The conveyor belt 3 is arranged slidably on the upper side of the vacuum container 4. At the side facing the transfer device 1, a deflecting strip 7 is arranged on the vacuum container 4, to which a vacuum can be applied, with a deflecting roll 8, along which the conveyor belt is deflected.

As shown in FIGS. 2a–c, the vacuum container 4 has on its upper side a slide surface 9 for the conveyor belt 3, which is equipped with slots 10. Two connection pieces 11 serve to connect the vacuum container 4 to a vacuum pump (not shown). On the left-hand side of FIGS. 2a and 2b, the deflecting strip 7 can be arranged so as to be tight with deflecting roll 8, which roll is represented in FIGS. 4a–c and FIG. 5, and which closes the vacuum container 4 against the transfer device 1.

The conveyor belt 3 (FIG. 3) has regularly configured suction orifices 12 disposed above slots 10 and which, via said slots, provide a constant connection between the transport surface of the conveyor belt 3 and the interior of the vacuum container 4. In the slide surface 9 there are provided bores 13 for fixing screws for attachment of the deflecting strip 7.

The deflecting strip 7 is configured as an insert for the vacuum container 4 and can be screwed thereto. To this end, the deflecting strip 7 has threaded bores 14 which correspond to the bores 13. The deflecting strip 7, being made out of a wear-resistant and slidable plastic, is further provided with a shell-like plain bearing surface 15 for the deflecting roll 8, so as to achieve an optimum seal. In the deflecting strip 7, there are incorporated suction bores 16 and channels 17, which provide a connection between the transport surface of the conveyor belt 3 and the interior of the vacuum container 4. The deflecting roll 8 has two circumferential grooves 18 which correspond with the suction bores 16 and the channels 17.

The conveyor belt 3 is arranged on the vacuum container 4 and the deflecting roll 8 with such tension that an optimal seal of the same against the deflecting strip 7 is provided, without, however, impeding movement of the conveyor belt. On the side of the vacuum container 4 facing away from the deflecting strip 7, the vacuum container 4 is closed with a sealing strip (not shown) which forms a component of a discharge device.

Figure 6:
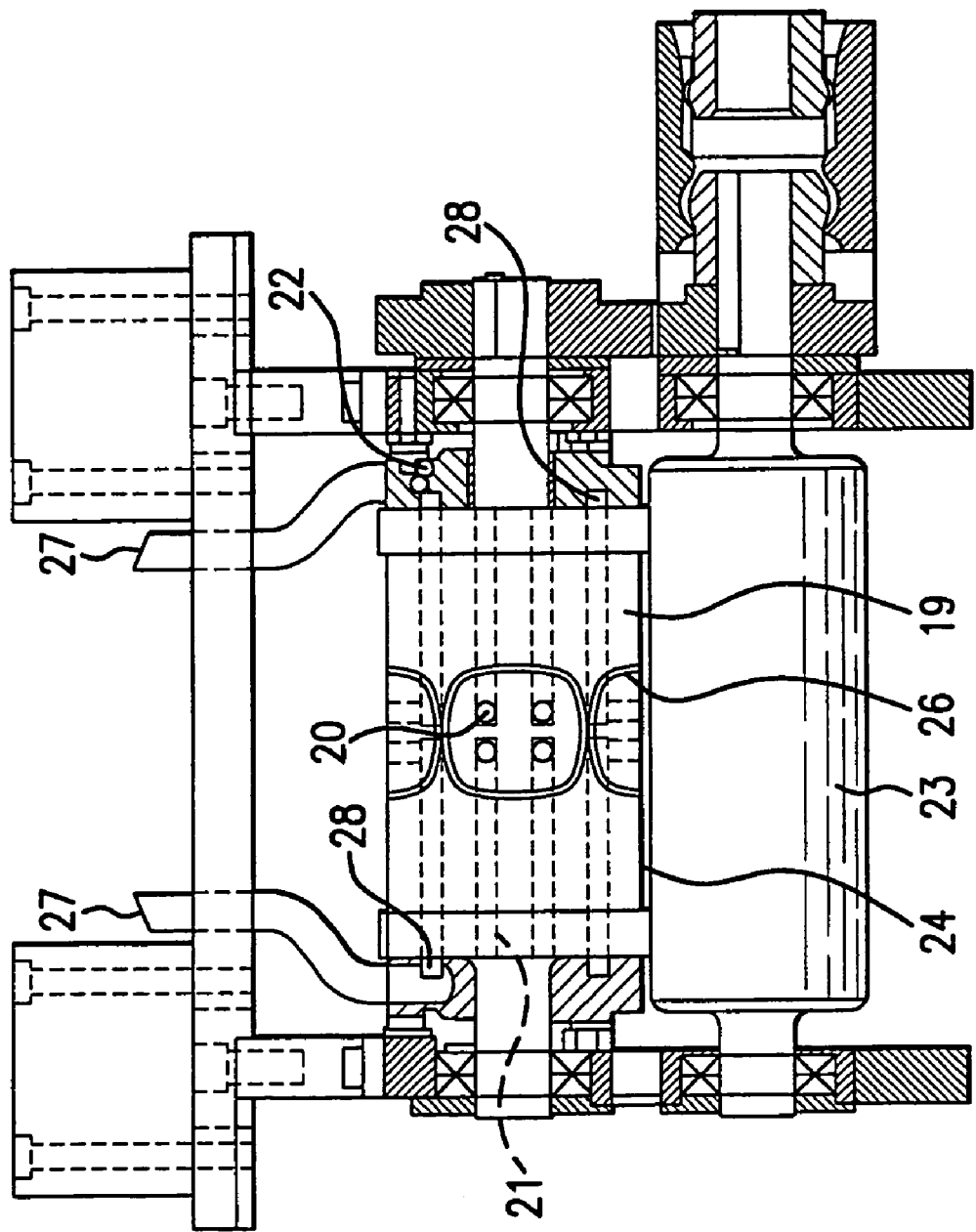
FIG. 6 is a transfer device with a punching roll, seen from the conveyor belt.

The transfer device 1 (FIG. 6) comprises a punching roll 19, to which a vacuum is applied. In the area of the flat-shaped products to be transferred, the surface of said punching roll 19 is provided with suction orifices 20 which lead via channels 21, formed in the interior of the punching roll 19, to vacuum chamber members 22 disposed at the end faces. Together with a counter pressure roll 23, the punching roll 19 forms a slot 24 for the passage of the web 25, from which the products are punched out. To this end, the punching roll 19 is provided with cutting edges 26 which correspond to the shape of the products.

The vacuum chamber members which connect the punching roll 19 with a vacuum pump (not shown) have a concentric groove 28 as well as a ventilation channel 29 which correspond with the end-face openings of the channels 21. Groove 28 is connected via a threaded bore 27a with a conduit 27, and the ventilation channel 29 is connected via a bore 29a with the atmosphere (FIGS. 7a–d). The vacuum chambers 22 are disposed axially and rotatably relative to the punching roll 19, so that it is possible to set various alternating positions and thus various positions of the respective groove 28 and the respective ventilation channel 29 relative to the transport device 2.

The transfer device 1 and the transport device 2 are arranged relative to each other in such a way that the products are able to pass through the slot formed between the two devices 1, 2 without being obstructed, but lie within the suction area of the transport device 2.

The transfer device 1 functions such that a web of material 25, from which the products are to be segregated and transported further, is conveyed between the punching roll 19 and the counter pressure roll 23 and passes over the latter. In this process, the products are severed from the web 25 by the cutting edges 26. The vacuum chamber members 22 are adjusted such that the suction orifices 20 above which there is the -respective product which is just being punched are connected via the channels 21 and the groove 28 with the vacuum ducts 27, so that the product, after having been severed, initially remains aspirated at the rotating punching roll 19. The product adheres to the punching roll 19 until the channels 21 are rotated out of the region of the groove 28 and enter the region of the ventilation channel 29. At that point at the latest, will the respective product become detached from the punching roll 19. Due to the given arrangement of the transport device 2 and the immediate proximity of the sucking conveyor belt 3 which above the deflecting roll 8 is already within the suction region, the punched-out products are successively (possibly also side by side) aspirated, taken over in the arrangement as pre-determined by the transfer device 1 and transported further in the said arrangement.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for segregation and ordered transfer of product segments punched out from a web of material, said method comprising the steps of:
   a) conveying said web of material between a punching roll and a counter pressure roll, said punching roll having a plurality of cutting edges arranged on a circumference thereof, and a plurality of suction orifices, each cutting edge having a closed contour corresponding to a shape of the product segments;
   b) punching out a first of said product segments from said web with one of said cutting edges to provide a punched-out product segment;
   c) adhering said first punched-out product segment on said punching roll by a vacuum connected to at least one of said suction orifices;
   d) rotating said punching roll until said punched-out product segment is proximate to a deflecting roll and a conveyor belt which is deflected along said deflecting roll;
   e) detaching said punched-out product segment from said punching roll by removing said vacuum to said at least one suction orifice, and ventilating said at least one suction orifice with a gas stream to urge said punched-out product segment from said punching roll; and f) transferring said punched-out product segment from said punching roll onto said conveyor belt by aspiring said product segment to said conveyor belt by applying a vacuum to said deflecting roll and to said conveyor belt as said segment detaches from said punching roll; and repeating the above-mentioned steps to punch out and to transfer, in an ordered manner, at least one further product segment to said conveyor belt, the punched-out product segments being successively aspirated and disposed on said conveyor belt in an ordered arrangement predetermined by an arrangement of said plurality of cutting edges provided on the circumference of the punching roll and being continuously transported in said predetermined arrangement.

2. Method according to claim 1, wherein the steps are performed continuously.

3. Method according to claim 1, wherein the steps are performed sequentially.

4. Method according to claim 1, wherein the steps of punching and adhering occur simultaneously.

5. Method according to claim 1, wherein the steps of detaching and transferring are accelerated by blowing a gas stream through said at least one suction orifice to detach said punched-out product segment from said punching roll.

6. Method according to claim 1, wherein said punched-out product segment is flat.

7. Method according to claim 1, wherein said punched-out product segment is selected from the group consisting of: a plaster, a pressure-sensitive adhesive label and a postage stamp.

8. Method according to claim 1, wherein adjacent to the deflecting roll is a deflecting strip that is provided with a bearing surface for the deflecting roll.

9. Method according to claim 8, wherein said deflecting strip is made of a wear resistant and slidable plastic.

10. Method according to claim 1, further comprising discharging said product segments with a discharge device, said discharge device being blocked from the vacuum acting on said conveyor belt.

11. Method according to claim 1, wherein the conveying of said web of material between the punching roll and the counter pressure roll comprises conveying said web of material through a slot formed by the punching roll and the counter pressure roll, said slot being immediately adjacent to the conveyor belt.

12. Method according to claim 1, further comprising deflecting the web of material by the counter pressure roll subsequent to the step of punching out a product segment.

13. Method according to claim 1, further comprising:
providing evenly arranged suction apertures on said conveyor belt, said vacuum applied to said conveyor belt being applied to said evenly arranged suction apertures; and
adhering said punched-out product segments to said conveyor belt by said evenly spaced apertures.

14. Method according to claim 1, further comprising providing said conveyor belt with suction apertures arranged in a longitudinal direction of said conveyor belt, said suction apertures being closer to a center of said conveyor belt than to an edge of said conveyor belt.

15. Method according to claim 1, further comprising transferring said punched-out product from said punching roll to said conveyor belt at a position tangential to a circumference of said punching roll, said position tangential to said circumference defining a tangential line tangential to said punching roll, and arranging said punching roll and said conveyor belt such that said tangential line is disposed at an acute angle relative to a line which is parallel to a substantially horizontal run direction of said conveyor belt.

16. Method according to claim 1, further comprising elevating said punched-out product segments to be proximate to said deflecting roll subsequent to adhering said punched-out product segments on said punching roll.

17. Method according to claim 8, further comprising disposing said deflecting strip between said deflecting roll and a vacuum container.

18. A method for continuous segregation and ordered transfer of product segments punched out from a web of material, said method comprising the sequential steps of:

a) conveying said web of material between a punching roll and a counter pressure roll, said punching roll having a plurality of cutting edges arranged on a circumference thereof, and a plurality of suction orifices, each cutting edge having a closed contour corresponding to a shape of the product segments;

b) punching out a first of said product segments from said web with one of said cutting edges to provide a punched-out product segment, said punched-out product segment being flat and being selected from the group consisting of: a plaster, a pressure-sensitive adhesive label and a postage stamp;

c) adhering said first punched-out product segment out said punching roll by a vacuum connected to at least one of said suction orifices, said punching and adhering occurring simultaneously;

d) rotating said punching roll until said punched-out product segment is proximate to a deflecting roll and a conveyor belt which is deflected along said deflecting roll;

e) detaching said punched-out product segment from said punching roll by removing said vacuum to said at least one suction orifice, and ventilating said at least one suction orifice with a gas stream to urge said punched-out product segment from said punching roll;

f) transferring said punched-out product segment from said punching roll onto said conveyor belt by aspiring said product segment to said conveyor belt by applying a vacuum to said deflecting roll and to said conveyor belt as said segment detaches from said punching roll;

repeating the above-mentioned steps to punch out and to transfer, in an ordered manner, at least one further product segment to said conveyor belt, the punched-out product segments being successively aspirated and disposed on said conveyor belt in an ordered arrangement predetermined by an arrangement of said plurality of cutting edges provided on the circumference of the punching roll and being continuously transported in said predetermined arrangement; and accelerating the steps of detaching and transferring by blowing a gas steam through said at least one suction orifice to detach said punched-out product from said punching roll;

providing a deflection strip adjacent to the deflecting roll, said deflecting strip being made of a wear resistant and slidable plastic and being disposed between said deflecting roll and said vacuum container;

conveying said web of material between the punching roll and the counter pressure roll through a slot formed by the punching roll and the counter pressure roll, disposing said slot immediately adjacent to the conveyor belt;

deflecting the web of material by the counter pressure roll subsequent in the step of punching out a product segment;

providing said conveyor belt with suction apertures evenly arranged in a longitudinal direction of said conveyor belt, said suction apertures being closer to a center of said conveyor belt than to an edge of said conveyor belt;

applying a vacuum to said evenly arranged suction apertures on said conveyor belt;

adhering said punched-out product segments to said conveyor belt by said evenly spaced apertures; and elevating said punched-out product segments to be proximate to said deflecting roll subsequent to adhering said punched-out product segments on said punching roll.

* * * * *